United States Patent Office 3,651,137
Patented Mar. 21, 1972

3,651,137
SELECTIVE CONVERSION OF $N^{alpha},N^{epsilon}$-DIACETYLLYSINE ESTERS TO $N^{alpha},N^{epsilon}$-DIACETYLLYSINE
Tucker T. Yee, Claymont, Del., assignor to Atlantic Richfield Company, New York, N.Y.
No Drawing. Filed Dec. 23, 1969, Ser. No. 887,789
Int. Cl. C07c 103/50
U.S. Cl. 260—534 L                    7 Claims

ABSTRACT OF THE DISCLOSURE

The alkyl esters of $N^{alpha},N^{epsilon}$-diacetyllysine are converted to the $N^{alpha},N^{epsilon}$-diacetyllysine by first reacting the ester with ammonium hydroxide or an ammoniacal-alcohol solution to produce the $N^{alpha},N^{epsilon}$-diacetyllysine amide, a novel compound, and then by reacting the amide with glacial acetic acid saturated with gaseous hydrogen chloride to hydrolyze the amide to the $N^{alpha},N^{epsilon}$-diacetyllysine.

The diacetyllysine is a racemic mixture but is conveniently resolved by reaction with an optically active amine to form a mixture of the salts which can be separated by fractional crystallization from which the desired L-lysine is produced.

BACKGROUND OF THE INVENTION

Field of the invention

This invention relates to a method for the selective conversion of alkyl esters of $N^{alpha},N^{epsilon}$-diacetyllysine, hereinafter referred to as alkyl esters of diacetyllysine, to the $N^{alpha},N^{epsilon}$-diacetyllysine, hereinafter referred to as diacetyllysine, by first converting the ester to the amide using ammonium hydroxide or ammoniacal-alcohol solution and thereafter hydrolyzing the amide to the diacetyllysine with glacial acetic acid saturated with hydrogen chloride.

Prior art

In one method for the synthesis of lysine, U.S. Pat. No. 2,999,875, cyclohexanone is nitrosated to give the 2,6-dioximinocyclohexanone using methyl nitrite and hydrogen chloride. If the 2,6-dioximinocyclohexanone is acylated using acetic anhydride and concentrated sulfuric acid there is produced the 2,6-diacetoximinocyclohexanone. The cleavage of the ring of this compound if carried out using sodium ethoxide in ethanol produces ethyl 5-cyano-2-oximinovalerate. If the cleavage is carried out using sodium methoxide in benzene there is produced the methyl-2-acetoximino-5-cyanovalerate. The classical method involves the preparation of ester of 5-cyano-2-oximinovalerate by reaction of the sodium salt of malonic esters with 1-bromo-3-cyanopropane, then nitrosation with nitrous acid. These esters and higher alkyl esters are also produced by the process in the copending application of Yee, Ser. No. 839,060, filed July 3, 1969, entitled "Method for the Ring Cleavage of 2,6-Dioximinocyclohexanone." In this method the dioximinocyclohexanone or its sodium salt is contacted with acetic anhydride and a $C_1$ to $C_5$ primary or secondary aliphatic alcohol. These esters are shown in the literature to be converted to the DL-$N^{alpha},N^{epsilon}$-diacetyllysine by reduction with hydrogen using platinum or Raney nickel catalyst in the presence of acetic anhydride.

The DL-diacetyllysine alkyl esters, however, cannot be hydrolyzed directly to the diacetyllysine, but instead are converted to the DL-lysine. In the copending application of Yee et al. filed of even date herewith there is shown a method for the resolution of DL-diacetyllysine and thereafter producing the desired L-lysine. This method which depends on reacting the DL-diacetyllysine with an optically active base such as an amine is not applicable to the resolution of DL-lysine itself since the latter compound is too basic to react with another base such as an amine. Hence the DL-diacetyllysine is a useful intermediate in the synthesis of lysine because it can be resolved so that the desired L-lysine isomer can be obtained from it.

SUMMARY OF THE INVENTION

In accordance with the process of this invention the alkyl esters of diacetyllysine represented by the formula $$CH_3-\underset{\underset{O}{\|}}{C}-NH(CH_2)_4\underset{\underset{HN\underset{\underset{O}{\|}}{C}-CH_3}{|}}{CH}\underset{\|}{C}-OR$$

wherein R is an alkyl group containing from 1 to 5 carbon atoms, is reacted with ammonium hydroxide or a solution of methanol or ethanol saturated with ammonia to produce the novel amide represented by the formula $$CH_3-\underset{\underset{O}{\|}}{C}-NH(CH_2)_4\underset{\underset{HN\underset{\underset{O}{\|}}{C}-CH_3}{|}}{CH}\underset{\|}{C}-NH_2$$

This amide in turn is hydrolyzed with glacial acetic acid saturated with gaseous hydrogen chloride to produce the diacetyllysine represented by the formula $$CH_3-\underset{\underset{O}{\|}}{C}-NH(CH_2)_4\underset{\underset{HN\underset{\underset{O}{\|}}{C}-CH_3}{|}}{CH}\underset{\|}{C}-OH$$

A specific embodiment of the invention is the novel amide which is capable of being hydrolyzed to the diacetyllysine without removal of the acetyl groups.

It is an object of this invention therefore to provide a method for the conversion of alkyl esters of diaectyllysine to diacetyllysine.

It is another object of this invention to provide a method for the conversion of alkyl esters of diacetyllysine to diacetyllysine by producing a novel amide as an intermediate compound.

It is another object of this invention to provide a method for treating alkyl esters of diacetyllysine with ammonium hydroxide or an ammoniacal alcohol solution to produce the amide of diacetyllysine and thereafter hydrolyzing the amide to diacetyllysine.

Other objects of this invention will be apparent from the following description of the preferred embodiments and from the claims.

DESCRIPTION OF THE PREFERRED EMBODIMENTS

The following examples are provided to demonstrate that each of the steps is critical to the method of this invention.

EXAMPLE I

An attempt was made to hydrolyze alcohol esters of diacetyllysine using glacial acetic acid saturated with gaseous hydrogen chloride. A 2 gram sample of methyl diacetyllysine was refluxed with 100 ml. of glacial acetic acid saturated with gaseous hydrogen chloride for 6 hours. The resulting mixture was evaporated to dryness. It was attempted to recrystallize this material from anhydrous acetone, acetone-water and absolute ethanol, but in all cases the resulting material on infrared analysis showed it to be the starting material indicating no hydrolysis had occurred.

A second experiment was carried out utilizing 1 gram of methyl diacetyllysine and 150 ml. of glacial acetic acid saturated with hydrogen chloride. This mixture was refluxed for 20 hours and then evaporated to remove the solvent. The viscous yellowish residue was treated with acetone (30 ml.) but only a small amount of precipitate formed which was removed by filtration from the acetone. Analysis showed that no diacetyllysine had been formed.

The following examples show the preparation of the amide of diacetyllysine.

EXAMPLE II

In a pressure flask was placed 1.0 gram of methyl diacetyllysine and 100 ml. of methanol saturated with gaseous ammonia. This mixture was heated on a steam bath for 4 hours, then allowed to stand at room temperature for about 16 hours. After evaporation of the solvent a white crystalline residue having a melting point of 182–183° C. was obtained. This solid was very soluble in water and in methyl alcohol. Recrystallization from ethyl alcohol gave a very fine powder. The white powder was dissolved in isopropyl alcohol and on cooling precipitated slowly to give a white material having a melting point of 185–186° C. Evaporation of the solution gave 0.7 gram of crystals.

This substance appeared to be the amide and, accordingly, elemental analysis was carried out. The amide has the formula

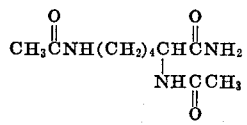

The molecular formula of the compound is $C_{10}H_{19}N_3O_3$ and the molecular weight is 229. A comparison of the elemental analysis is shown below.

|          | Theory, wt. percent | Found, wt. percent |
|----------|---------------------|--------------------|
| Carbon   | 52.39               | 51.83              |
| Hydrogen | 8.35                | 8.51               |
| Nitrogen | 18.31               | 18.70              |

These results were in excellent agreement with theory showing the amide had been produced. The best method for recrystallizing the white powder was found to be by dissolving it in methanol and then adding acetone with cooling to give a white precipitate. This white precipitate had a melting point of 187° C.–188° C. That the compound was the amide of diacetyllysine was confirmed by nuclear magnetic resonance and infrared spectroscopy.

EXAMPLE III

A 1 gram sample of ethyl diacetyllysine was heated with 100 ml. of methanol saturated with ammonia in a pressure flask for 6 hours on a steam bath. The mixture was allowed to stand at room temperature for 16 hours and then evaporated to dryness. The resulting solid was recovered from acetone. It was identified as the diacetyllysine amide. This material was recrystallized from methanol by the addition of acetone as described in Example II and showed the same chemical and physical properties as described for the amide in Example II.

EXAMPLE IV

Two runs were carried out utilizing concentrated ammonium hydroxide and esters of diacetyllysine. In the first run 1 gram of methyl diacetyllysine was heated for 2 hours on a steam bath in a pressure flask with 25 ml. of concentrated ammonium hydroxide. In the second run 1 gram of ethyl diacetyllysine was heated for 2 hours on a steam bath with 25 ml. of concentrated ammonium hydroxide. In each of the runs the reaction mixture was allowed to stand at room temperature for about 16 hours and the solvents evaporated by vacuum evaporation. The residues in each run were taken up in 25 to 30 ml. of acetone and stirred to give a white precipitate which was collected and dried. The compounds obtained in each case were identified as the amide of diacetyllysine by melting points and nuclear magnetic resonance and infrared spectroscopy.

These Examples, II, III and IV, show that various esters of diacetyllysine can be converted to the amide by using ammonium hydroxide or ammoniacal alcohol solutions. In other runs ammoniacal-ethanol was found to react more slowly than the ammonium hydroxide or ammoniacal ethanol. Although the same procedure was employed in carrying out each of these runs it should be noted that the quantity of ammonium hydroxide or ammoniacal alcohol should be in excess of that theoretically required. A reaction temperature obtained by a steam bath is convenient since this gives a complete reaction in a reasonably short time. Obviously since ammonia is being employed it would be lost rapidly to the atmosphere at the reaction temperature unless a closed system is employed. Prolonged standing at room temperature is not required for complete reaction but was merely used as a convenience in the laboratory.

In the following examples the critical features of the hydrolysis of the amide is set forth.

EXAMPLE V

A 1 gram sample of the amide of diacetyllysine prepared as described above was refluxed for about 16 hours with 50 ml. of 6 N hydrochloric acid. The mixture was cooled and evaporated to dryness then treated with 5 ml. of 95 percent ethanol and 1 ml. of pyridine. On stirring a white precipitate deposited and was collected by filtration. This substance (0.8 gram) was identified as lysine hydrochloride, showing that the use of aqueous hydrogen chloride alone not only hydrolyzes the diacetyllysine amide but also deacetylates the compound and, accordingly, this method is not suitable for hydrolysis of the amide.

EXAMPLE VI

A 3 gram sample of the amide of diacetyllysine was refluxed for about 16 hours with 100 ml. of glacial acetic acid. The final mixture was evaporated in a vacuum. The viscous residue was treated with a small amount of acetone and a white precipitate appeared instantly. An infrared spectrum of this precipitate showed it to be the starting material and 0.3 gram of the amide was recovered showing that no acidolysis had occurred.

EXAMPLE VII

A 1 gram sample of the amide of diacetyllysine was heated at reflux for 4 hours with 100 ml. of glacial acetic acid which had been saturated with gaseous hydrogen chloride. The reaction mixture which became slightly yellowish was vacuum evaporated to dryness. To this residue was added 150 ml. of acetone with stirring. There was obtained 0.6 gram of solid which was identified by infrared analysis as the $N^{alpha},N^{epsilon}$-diacetyllysine when compared with a known sample of this compound. It was found that ammonium chloride was present in the acetone filtrate showing that acidolysis had occurred.

These examples V, VI and VII show that it is necessary to utilize a combination of glacial acetic acid and hydrogen chloride for the acidolysis of the amide since the acid alone gives no reaction whereas aqueous hydrogen chloride deacetylates the amide as well as hydrolyzing it.

The $N^{alpha},N^{epsilon}$-diacetyllysine prepared in accordance with the method of this invention is a mixture of the D and L isomers. It is useful, however, since the DL-diacetyllysine can be resolved and the desired L-lysine obtained by the method of Yee et al. described in the application filed of even date herewith.

In this method the DL-diacetyllysine is reacted with an optically active base such as an optically active amine, for example, D-(+)-alphamethylbenzylamine to give the salt which is a mixture of the DD isomer and the DL isomer. This salt formation proceeds easily and quantitatively at room temperature with water as a solvent. The salt is recovered by evaporation of the solvent and is fractionally crystallized from an ethanol-acetone solution (1:2.4 volume ratio of ethanol to acetone) by seeding with crystals of the salt of D-(+)-alphamethylbenzylamine and L-diacetyllysine (prepared from pure L-lysine). The thus crystallized salt of D-(+)-alphamethylbenzylamine and L-diacetyllysine is separated, dissolved in water and passed over a cation exchange resin to obtain the L-diacetyllysine in the effluent. The L-diacetyllysine is thereafter hydrolyzed with hydrochloric acid to obtain the L-lysine·2HCl which is converted in turn to the L-lysine·HCl by treatment with pyridine.

I claim:

1. The method for the selective conversion of alkyl esters of $N^{alpha},N^{epsilon}$-diacetyllysine having the formula

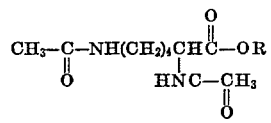

wherein R is an alkyl group containing from 1 to 5 carbon atoms to $N^{alpha},N^{epsilon}$-diacetyllysine which comprises:

(1) reacting said ester of the $N^{alpha},N^{epsilon}$-diacetylamine with a stoichiometrical excess of ammonium hydroxide, amoniacal-methanol or ammoniacal-ethanol at a temperature of about 100° C. under the autogenous pressure of the reactants to produce the amide of the $N^{alpha},N^{epsilon}$-diacetyllysine having the formula

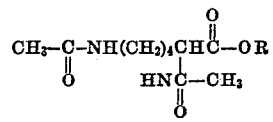

and (2) hydrolyzing said amide produced in step (1) to the $N^{alpha},N^{epsilon}$-diacetyllysine by contacting said amide with excess glacial acetic acid saturated with hydrogen chloride under reflux conditions.

2. The method according to claim 1 wherein ammonium hydroxide is employed to produce the amide in step (1).

3. The method according to claim 1 wherein ammoniacal methanol is employed to produce the amide in step (1).

4. The method according to claim 1 wherein ammoniacal ethanol is employed to produce the amide in step (1).

5. The method according to claim 1 wherein the alkyl group of the ester is methyl.

6. The method according to claim 1 wherein the alkyl group of the ether group is ethyl.

7. The amide of $N^{alpha},N^{epsilon}$-diacetyllysine having the formula

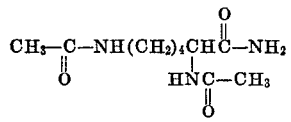

References Cited

UNITED STATES PATENTS

| | | | |
|---|---|---|---|
| 3,062,869 | 11/1962 | Gould | 260—534 L |
| 3,035,041 | 5/1962 | Schwyzer et al. | 260—561 K |
| 1,713,822 | 5/1929 | Dox | 260—561 K |

OTHER REFERENCES

Advanced Organic Chemistry: "Reactions, Mechanisms, and Structure," Jerry March, pp. 313–315; 338–39.

Reactions of Org. Compounds, Hickinbottom, pp. 227–231.

JAMES A. PATTEN, Primary Examiner

J. L. DAVISON, Assistant Examiner

U.S. Cl. X.R.

260—482 R, 561 A